(12) United States Patent
Ma et al.

(10) Patent No.: US 11,036,288 B2
(45) Date of Patent: Jun. 15, 2021

(54) HEAD-MOUNTED VIRTUAL REALITY DISPLAY DEVICE, METHOD FOR MEASURING POSITION AND POSTURE OF THE SAME AND VIRTUAL REALITY DISPLAY APPARATUS

(71) Applicants: Beijing BOE Optoelectronics Technology Co., Ltd., Beijing (CN); BOE Technology Group Co., Ltd., Beijing (CN)

(72) Inventors: Zhanshan Ma, Beijing (CN); Wenhong Tian, Beijing (CN); Minglei Chu, Beijing (CN); Chenru Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 56 days.

(21) Appl. No.: 16/470,544

(22) PCT Filed: Nov. 14, 2018

(86) PCT No.: PCT/CN2018/115433
§ 371 (c)(1),
(2) Date: Jun. 17, 2019

(87) PCT Pub. No.: WO2019/205588
PCT Pub. Date: Oct. 31, 2019

(65) Prior Publication Data
US 2020/0379552 A1 Dec. 3, 2020

(30) Foreign Application Priority Data
Apr. 23, 2018 (CN) .......................... 201810365837.4

(51) Int. Cl.
*G06F 3/01* (2006.01)
*G06T 7/70* (2017.01)
(Continued)

(52) U.S. Cl.
CPC .............. *G06F 3/012* (2013.01); *G01S 17/42* (2013.01); *G06F 1/163* (2013.01); *G06T 7/70* (2017.01);
(Continued)

(58) Field of Classification Search
CPC ................................ G02B 27/01; G06F 3/012
See application file for complete search history.

(56) References Cited

U.S. PATENT DOCUMENTS 9,910,284 B1 * 3/2018 Nortrup .................... G02B 5/04
10,039,445 B1 * 8/2018 Torch ...................... A61B 5/165
(Continued)

FOREIGN PATENT DOCUMENTS

CN 202564709 U 11/2012
CN 105159450 A 12/2015
(Continued)

OTHER PUBLICATIONS

International Search Report and Written Opinion (including English translation of search report and Box V of the Written Opinion) for International Application No. PCT/CN2018/115433, dated Feb. 14, 2019, 13 pages.

*Primary Examiner* — Chikaodili E Anyikire
(74) *Attorney, Agent, or Firm* — Westman, Champlin & Koehler, P.A.

(57) ABSTRACT

A head-mounted virtual reality display device, a method for measuring position and posture of the head-mounted virtual reality display device and a virtual reality display apparatus are provided. The head-mounted virtual reality display device includes: a body; and at least four infrared light
(Continued)

reflectors arranged on an outer face of the body and configured to retroreflect an infrared light beam, wherein the at least four infrared light reflectors are not co-planar.

18 Claims, 6 Drawing Sheets

(51) Int. Cl.
  *G01S 17/42* (2006.01)
  *G06F 1/16* (2006.01)
  *H04N 5/225* (2006.01)
(52) U.S. Cl.
  CPC . *H04N 5/2256* (2013.01); *G06T 2207/10048* (2013.01)

(56) References Cited

U.S. PATENT DOCUMENTS

| | | | |
|---|---|---|---|
| 10,095,307 B2 | 10/2018 | Raffle et al. | |
| 10,180,579 B2* | 1/2019 | Mak | G02B 27/0176 |
| 10,338,400 B2* | 7/2019 | Connor | G02B 30/52 |
| 10,598,938 B1* | 3/2020 | Huang | G02B 27/4205 |
| 10,656,720 B1* | 5/2020 | Holz | G06F 3/017 |
| 10,726,574 B2* | 7/2020 | Ninan | G06F 3/0308 |
| 10,771,898 B2* | 9/2020 | Dusan | H04M 1/6008 |
| 10,775,616 B1* | 9/2020 | Ouderkirk | G06F 3/013 |
| 10,789,777 B1* | 9/2020 | Sheikh | G02B 27/0172 |
| 2014/0184496 A1* | 7/2014 | Gribetz | G02B 27/017 |
| | | | 345/156 |
| 2015/0258431 A1* | 9/2015 | Stafford | A63F 13/211 |
| | | | 463/31 |
| 2016/0223819 A1* | 8/2016 | Liu | G06F 3/013 |
| 2017/0329398 A1 | 11/2017 | Raffle et al. | |
| 2018/0046874 A1* | 2/2018 | Guo | G06K 9/3208 |
| 2018/0239430 A1* | 8/2018 | Tadi | G02B 27/017 |
| 2019/0361523 A1* | 11/2019 | Sharma | G02B 27/0977 |
| 2020/0320734 A1* | 10/2020 | Ninan | G02B 27/0172 |

FOREIGN PATENT DOCUMENTS

| | | |
|---|---|---|
| CN | 106226907 A | 12/2016 |
| CN | 106406509 A | 2/2017 |
| CN | 107423720 A | 12/2017 |
| CN | 207216145 U | 4/2018 |
| CN | 108563334 A | 9/2018 |

\* cited by examiner

HEAD-MOUNTED VIRTUAL REALITY DISPLAY DEVICE, METHOD FOR MEASURING POSITION AND POSTURE OF THE SAME AND VIRTUAL REALITY DISPLAY APPARATUS

CROSS-REFERENCE TO RELATED APPLICATION

The present application is a Section 371 National Stage Application of International Application No. PCT/CN2018/1154733, filed on Nov. 14, 2018, entitled "HEAD-MOUNTED VIRTUAL REALITY DISPLAY DEVICE, METHOD FOR MEASURING POSITION AND POSTURE OF THE SAME AND VIRTUAL REALITY DISPLAY APPARATUS", which claims the benefit of Chinese Patent Application No. 201810365837.4 filed on Apr. 23, 2018 with the China National Intellectual Property Administration, the whole disclosure of which is incorporated herein by reference.

TECHNICAL FIELD

The present disclosure relates to the field of virtual reality and space orientation technologies, and more particularly, to a head-mounted virtual reality display device, a method for measuring position and posture of the head-mounted virtual reality display device, and a virtual reality display apparatus.

BACKGROUND

In the virtual reality field, it is very significant for an interactive space orientation system to provide immersion. The space orientation system has also become necessary in the head-mounted virtual reality display device. At present, the space orientation system used in the head-mounted virtual reality display device is divided into two classifications:

1. One space orientation system is based on a laser emitter and determines a position of a moving object by laser and photosensitive sensors; its principle is in that: at least two laser emitters is used to scan along X direction and Y direction respectively and to emit an infrared light beam and a plurality of infrared receivers are provided on a body of a head-mounted virtual reality display device, and in the same posture, receivers that have quantity greater than a certain threshold receive the infrared light beam emitted from the laser emitter simultaneously and position and posture of the head-mounted virtual reality display device in space are calibrated from differences in optical path length and angle of the infrared light beam received by the respective receivers.

2. The other space orientation system is based on spots of infrared light emitting diodes(LEDs); its principle is in that: a plurality of infrared LEDs are arranged on the body of the head-mounted virtual reality display device, and the light emitted from the infrared LEDs is transmitted through a housing and infrared cameras external to the device shot the spots of infrared light emitting diodes so as to solve positions and posture of the head-mounted virtual reality display device in space.

SUMMARY

The present disclosure provides a head-mounted virtual reality display device, including: a body; and at least four infrared light reflectors arranged on an outer face of the body and configured to retroreflect an infrared light beam, wherein the at least four infrared light reflector s are not co-planar.

In some embodiments, each of the infrared light reflectors includes a retroreflecting film.

In some embodiments, the retroreflecting film includes a reflective film with an array of beads.

In some embodiments, the at least four infrared light reflectors include a first infrared light reflector and a second infrared light reflector, and wherein an infrared spot formed by the infrared light beam reflected by the first infrared light reflector is different from another infrared spot formed by the infrared light beam reflected by the second infrared light reflector.

In some embodiments, the first infrared light reflector has a larger reflection surface area than the second infrared light reflector.

In some embodiments, the reflection surface area of the first infrared light reflector is twice as much as the reflection surface area of the second infrared light reflector.

In some embodiments, the first infrared light reflector has a shape different from that of the second infrared light reflector.

In some embodiments, the body includes a display screen and a head hand which is connected with the display screen and wearable by a wearer, the display screen having a first side on which an image is to be displayed to the wearer and a second side facing away from the first side, the head band having a third side which faces away from the first side of the display screen when the head-mounted virtual reality display device is worn by the wearer, and wherein the first infrared light reflector includes: a third infrared light reflector arranged at a center of a surface on the second side of the display screen, and a fourth infrared light reflector arranged on a surface on the third side of the head band; and wherein the second infrared light reflector includes: a plurality of fifth infrared light reflectors arranged around the third infrared light reflector, and sixth infrared light reflectors arranged around the fourth infrared light reflector on the surface on the third side of the head band.

In some embodiments, the plurality of fifth infrared light reflectors arranged around the third infrared light reflector include: a first group of the fifth infrared light reflectors arranged in a first peripheral region adjacent to an edge of the display screen and arranged to surround the third infrared light reflector, and a second group of the fifth infrared light reflectors arranged in a second peripheral region and arranged to surround the third infrared light reflector, the second peripheral region being closer to the third infrared light reflector than the first peripheral region; wherein a plurality of said fourth infrared light reflectors are provided on the surface on the third side of the head band; and wherein a plurality of said sixth infrared light reflectors are provided on the surface on the third side of the head band and each of the fourth infrared light reflectors is surrounded by at least some ones of the sixth infrared light reflectors.

In some embodiments, one third infrared light reflector is arranged at the center of the surface on the second side of the display screen; and wherein the first group of the fifth infrared light reflectors includes six fifth infrared light reflectors and the second group of the fifth infrared light reflectors includes four fifth infrared light reflectors.

In some embodiments, two fourth infrared light reflectors and six sixth infrared light reflectors are provided on the surface on the third side of the head band; and wherein each of the fourth infrared light reflectors is surrounded by four ones of the six sixth infrared light reflectors.

The present disclosure also provides a virtual reality display apparatus, including: the head-mounted virtual reality display device as described in any one of the above embodiments; an infrared light source configured to emit the infrared light beam to the at least four infrared light reflectors; and an image collector configured to collect the infrared light beam reflected by the infrared light reflectors and to generate image data for calculating position and posture of the body in space.

In some embodiments, the infrared light source and the image collector are arranged adjacent to each other.

In some embodiments, the body includes a processor configured to receive the image data from the image collector and to calculate the position and posture of the body in space on a basis of the image data.

In some embodiments, the virtual reality display apparatus further includes a processor separated from the body, the processor being configured to receive the image data from the image collector and to calculate the position and posture of the body in space on a basis of the image data; and wherein the processor is further configured to transmit information on the position and posture of the body in space to the body.

The present disclosure provides a method for measuring position and posture of the head-mounted virtual reality display device as described in any one of the above embodiments, the method including: emitting the infrared light beam to the infrared light reflectors; and collecting the infrared light beam reflected by the infrared light reflectors by an image collector so as to generate image data, and calculate the position and posture of the body in space on a basis of the image data.

BRIEF DESCRIPTION OF THE DRAWINGS

Specific embodiments of the present disclosure will further be explained in details with reference to the accompanying drawings.

DETAILED DESCRIPTION OF EMBODIMENTS

Figure 1:
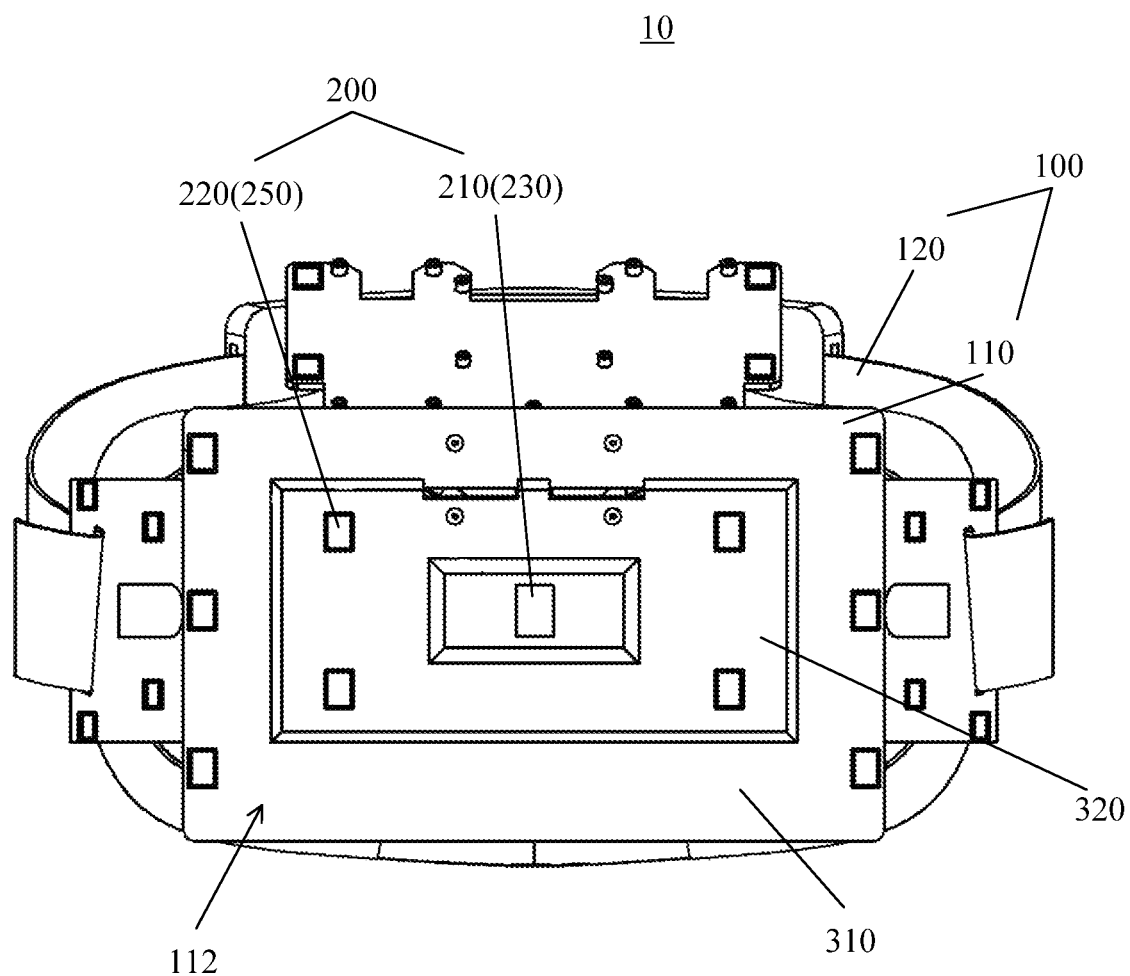
FIG. 1 is a front view of a head-mounted virtual reality display device in accordance with embodiments of the present disclosure.

The present disclosure will further be described in detail below with reference to the drawings and preferred embodiments such that the present disclosure becomes explicit. Throughout drawings, similar components are represented by same reference numerals. The skilled person in the art should understand that the following description is illustrative instead of limiting the scope of the present disclosure.

Figure 2:
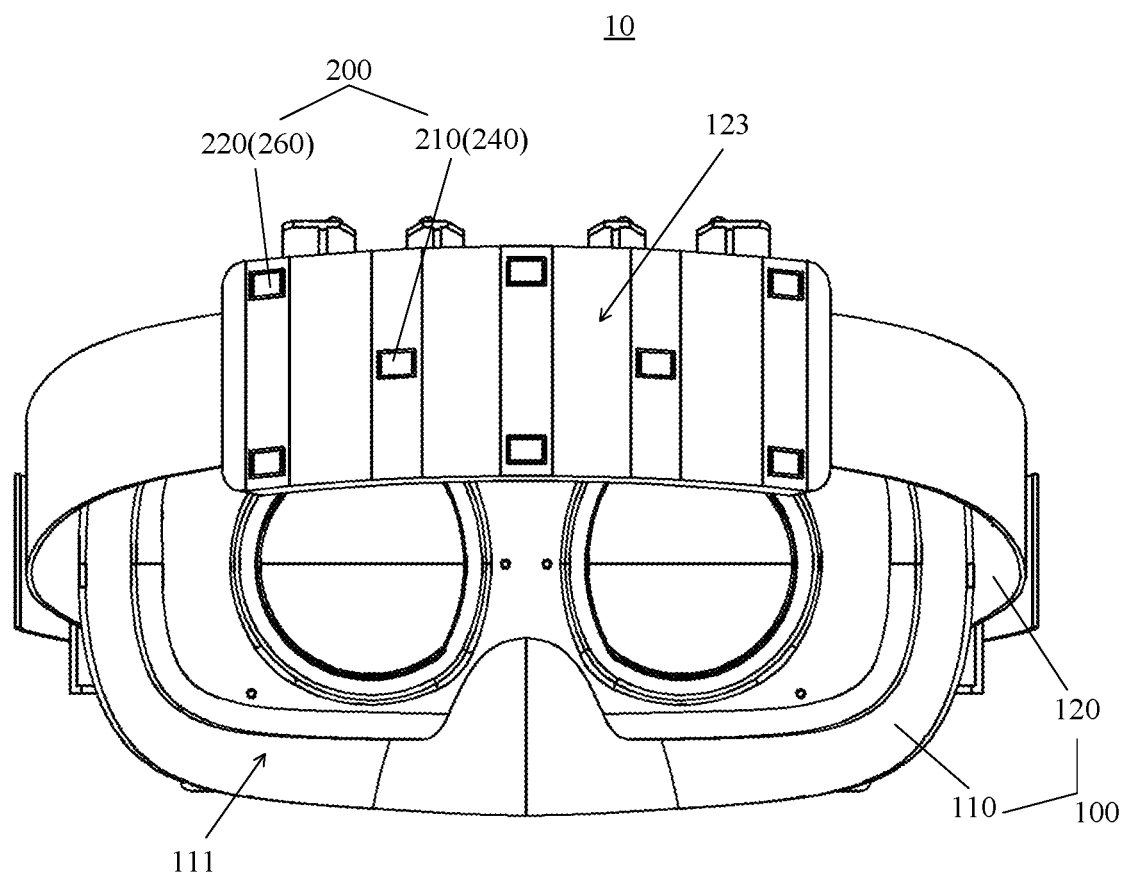
FIG. 2 is a rear view of a head-mounted virtual reality display device in accordance with embodiments of the present disclosure.

FIG. 1 and FIG. 2 show a head-mounted virtual reality display device 10. The head-mounted virtual reality display device 10 includes a body 100, and a plurality of infrared light reflectors 200 arranged on an outer face of the body 100.

The plurality of infrared light reflectors 200 can reflect an infrared light beam (for example an infrared light beam emitted from an infrared light source 20) such that infrared spots formed by the reflected infrared light beam can be collected by an image collector 30 to generate image data. From further process and calculation on the image data, location information of the body 100 of the head-mounted virtual reality display device can be obtained. The location information may include physical coordinates, position and posture of the body 100 of the head-mounted virtual reality display device in space. When a user wears the body 100 of the head-mounted virtual reality display device and moves, the location information of the body 100 of the head-mounted virtual reality display device can be acquired in real time so as to provide better immersion for the user.

In exemplary embodiments of the present disclosure, a plurality of infrared light beams reflected by the plurality of infrared light reflectors 200 will form a three-dimensional shape in order to determine the orientation of the head-mounted virtual reality display device 10 in space, thus the number of the infrared light reflectors 200 is not less than four, and at least four infrared light reflectors 200 are not co-planar or not located in a same plane. In optional embodiments of the present disclosure, the plurality of infrared light reflectors 200 may be located in different plane respectively.

In some embodiments of the present disclosure, the infrared light reflectors 200 may be configured to retroreflect an infrared light beam. The terms of "retroreflect" and "retroreflection" refer to a light reflection that the reflected light returns to a light source along a direction opposite to a direction of an incident light and adjacent to the incident light. When the direction of the incident light varies in a relative large range, such property can still be kept. For example, the reflected light only has a small divergence angle with reference to the anti-direction of the incident light, such as less than 10 degrees, even less than 5 degrees.

The infrared light reflectors 200 with such retroreflection may return the infrared light beam emitted by the infrared light source 20 substantially along an original path. In this way, the image collector 30 for receiving the reflected infrared light beam and the infrared light source 20 may be arranged side by side. It is helpful to simplify structure of system.

In exemplified embodiments of the present disclosure, the infrared light reflectors 200 include a first infrared light reflector 210 and a second infrared light reflector 220, and an infrared spot formed by the infrared light beam reflected by the first infrared light reflector 210 is different from another infrared spot formed by the infrared light beam reflected by the second infrared light reflector 220. That is, after the image collector 30 collects the infrared light beam and generates the image data, characterizing points can be arranged depending on different infrared spots because the infrared spots formed by the infrared light beam reflected by the first infrared light reflector 210 are different from those formed by the infrared light beam reflected by the second infrared light reflector 220. The characterizing points are used to distinct positions of infrared spots formed by the respective infrared light reflectors 200 in the image data. In this way, the location information of the body 100 of the head-mounted virtual reality display device can be calculated easily.

In specific embodiments of the present disclosure, in order that the infrared spots formed by the infrared light beam reflected by the first infrared light reflector 210 are different from those formed by the infrared light beam reflected by the second infrared light reflector 220, the first infrared light reflector 210 and the second infrared light reflector 220 may be arranged to have different reflective areas and/or shapes.

Figure 5A:
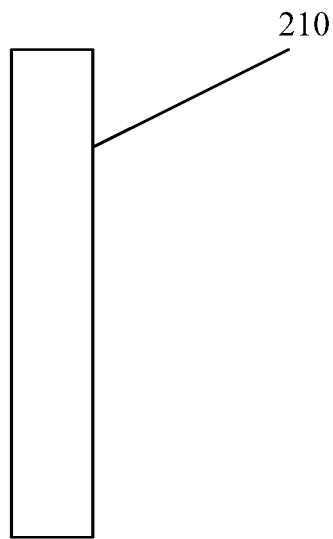
FIG. 5A and FIG. 5B show infrared light reflectors having different shapes.
Figure 5B:
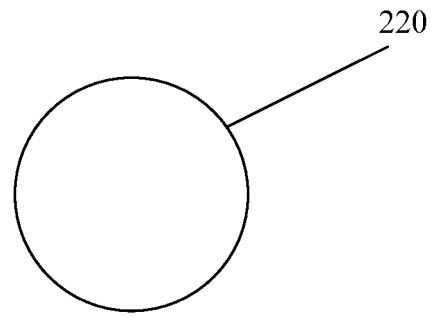
Figure 5C:
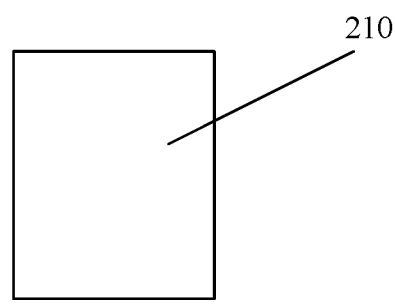
FIG. 5C and FIG. 5D show infrared light reflectors having different reflective surface areas.
Figure 5D:
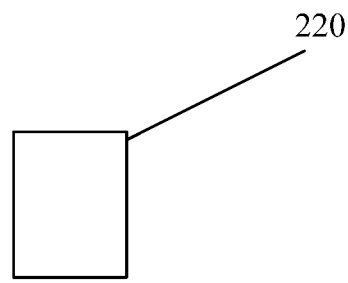

In exemplified embodiments, the first infrared light reflector 210 has a larger reflection surface area than the second infrared light reflector 220. As an example, the reflection surface area of the first infrared light reflector 210 is twice as much as the reflection surface area of the second infrared light reflector 220. For example, although the first infrared light reflector 210 shown in FIG. 5C and the second infrared light reflector 220 shown in FIG. 5D both have rectangular shapes, the reflective surface area of the first infrared light reflector 210 shown in FIG. 5C is significantly larger than the reflective surface area of the second infrared light reflector 220 shown in FIG. 5D.

In exemplified embodiments, the first infrared light reflector 210 and the second infrared light reflector 220 have different shapes. For example, the first infrared light reflector 210 shown in FIG. 5A has a shape of a strip while the second infrared light reflector 220 shown in FIG. 5B has a shape of a circle. However, shapes of the first infrared light reflector 210 and the second infrared light reflector 220 in the embodiments of the present disclosure are not limited to those. Different positions corresponding to different infrared spots can be distinguished from each other as long as the difference in shapes of the first infrared light reflector 210 and the second infrared light reflector 220 can distinguish the infrared spots formed by the infrared light beam reflected by the first infrared light reflector 210 from the infrared spots formed by the infrared light beam reflected by the second infrared light reflector 220.

For the sake of convenience of collecting the infrared spots formed by the reflected infrared light beam by the image collector, the infrared light reflector 200 in the present disclosure may include a retroreflecting film. The retroreflecting film may achieve retroreflection, that is, it may return the incident light along an original path and the reflected light has characteristics such as a small divergence angle, achieving a compact structure.

Figure 3:
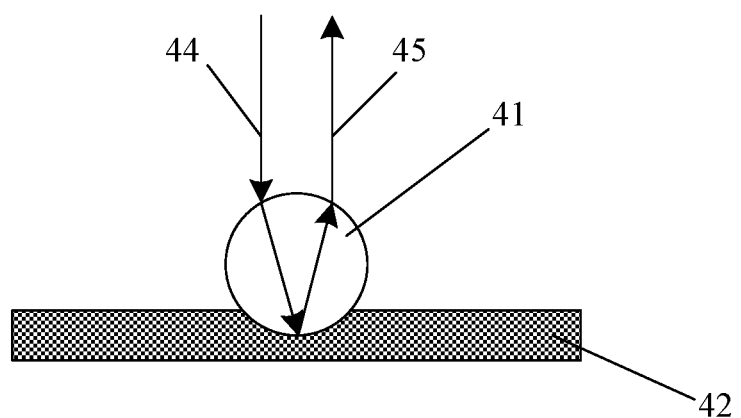
FIG. 3 shows schematically a principle of retroreflection of an infrared light reflector in accordance with embodiments of the present disclosure.
Figure 4:
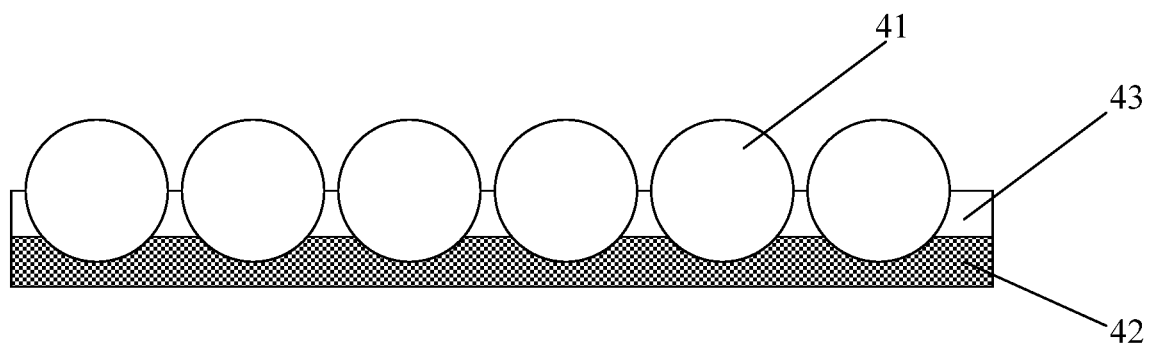
FIG. 4 is a schematic view showing a structure of an exemplified reflective film with an array of beads.

As an example, in the present disclosure, the retroreflecting film may include a reflective film 40 with an array of beads. FIG. 4 shows an example of the reflective film 40 with the array of beads. In the example, the reflective film 40 with the array of beads includes a plurality of spherical lenses 41, a reflective layer 42 and a transparent adhesive layer 43. The plurality of spherical lenses 41 are arranged on the reflective layer 42 and lower surfaces of the plurality of spherical lenses 41 are partly embedded into the reflective layer 42. The adhesive layer 43 is configured to adhere the plurality of spherical lenses 41 to the reflective layer 42. Each of the spherical lenses 41 has the retroreflecting effects on the infrared light beam, as shown in FIG. 3. The incident light 44 is refracted by an upper surface of each of the spherical lenses 41 and then is reflected at an interface between the spherical lens and the reflective layer 42. Next, the reflected light 45 exits from the spherical lens 41 along a direction substantially opposite to a direction of the incident light entering the spherical lens 41 so as to achieve the retroreflection. As an example, the spherical lenses 41 may have refractivity between 1.9 and 2.1, for example, they may have diameter less than 0.8 mm. For example, the spherical lenses 41 may be made from transparent materials such as glass. It should be noted that the structure of the retroreflecting film in the embodiments of the present disclosure are not limited to the above examples, and alternatively, any other forms of known structures of the reflective film 40 with the array of beads or any other forms of known retroreflecting film may be used.

The reflective film with the array of beads is one of the conventional important bead reflection materials. Typically, at present, the reflective film with the array of beads is formed by implanting the array of reflective beads arranged as patterns or words into a substrate, which is produced such as by injection or melting of materials such as ABS resin or PC resin. It has the following optical characteristics: it can retroreflect light emitted by the light source and have higher retroreflecting efficiency and performance in retroreflection.

That is, in exemplified embodiments of the present disclosure, the infrared light beam will be reflected by a surface of the infrared light reflector 200 with the array of beads and the reflected infrared light beam has a divergence of small degrees (for example within 10 degrees, even within 5 degrees) with respect to the incident light such that the infrared light beam can be collected conveniently by the image collector 30 after being reflected by the infrared light reflector 200.

In the examples shown in FIG. 1 and FIG. 2, the body 100 of the head-mounted virtual reality display device includes a display screen 110 and a head band 120 which is connected with the display screen 110 and wearable by a wearer. The display screen 110 has a first side 111 on which an image is to be displayed to the wearer and a second side 112 facing away from the first side 111. The head hand 120 has a third side 123 which faces away from the first side 111 of the display screen 110 when the head-mounted virtual reality display device is worn by the wearer.

When the head-mounted virtual reality display device is worn by the wearer, the first side 111 of the display screen 110 faces towards eyes of the wearer to provide image display. Correspondingly, the second side 112 of the display screen 110 faces away from the eyes of the wearer. When the head-mounted virtual reality display device is worn by the wearer, the third side 123 of the head band 120 faces away from eyes of the wearer. The first infrared light reflector 210 includes a group of infrared light reflector(s) (called as third infrared light reflector 230) arranged at a center of a surface on the second side 112 of the display screen 110 and another group of infrared light reflector(s) (called as fourth infrared light reflector 240) arranged on a surface on the third side 123 of the head band 120. The second infrared light reflector 220 includes: a plurality of fifth infrared light reflectors 250 arranged around the third infrared light reflector 230 which is arranged at a center of a surface on the second side 112 of the display screen 110; and a plurality of sixth infrared light reflectors 260 arranged around the fourth infrared light reflector 240 on the surface on the third side 123 of the head band 120.

As an example, the plurality of fifth infrared light reflectors 250 arranged around the third infrared light reflector 230 may include a first group of the fifth infrared light reflectors 250 and a second group of the fifth infrared light reflectors 250. The first group of the fifth infrared light reflectors 250 are arranged in a first peripheral region 310 adjacent to an edge of the display screen 110 and arranged to surround the third infrared light reflector 230. The second group of the fifth infrared light reflectors 250 are arranged in a second peripheral region 320 and arranged to surround the third infrared light reflector 230. The second peripheral region 320 is closer to the third infrared light reflector 230 than the first peripheral region 310. A plurality of fourth infrared light reflectors 240 are provided on the surface on the third side 123 of the head band 120. A plurality of sixth infrared light reflectors 260 are provided on the surface on the third side of the head band and each of the fourth infrared light reflectors 240 is surrounded by at least some ones of the sixth infrared light reflectors 260.

In an example, one third infrared light reflector 230 is arranged at the center of the surface on the second side 112 of the display screen 110 and ten fifth infrared light reflectors 250 are arranged around the third infrared light reflector 230. In particular, six fifth infrared light reflectors 250 (first group) are arranged in the first peripheral region 310 adjacent to an edge of the display screen 110 and arranged to surround the third infrared light reflector 230 at the center. And other four fifth infrared light reflectors 250 (second group) are arranged in a second peripheral region 320 and arranged to surround the third infrared light reflector 230 at the center. The second peripheral region 320 is closer to the third infrared light reflector 230 than the first peripheral region 310. Two fourth infrared light reflectors 240 are arranged on a surface on the third side 123 of the head band 120. Six fifth infrared light reflectors 250 are arranged around the fourth infrared light reflectors 240. Each of the two fourth infrared light reflectors 240 is surrounded by four ones of the six sixth infrared light reflectors 260.

Figure 6:
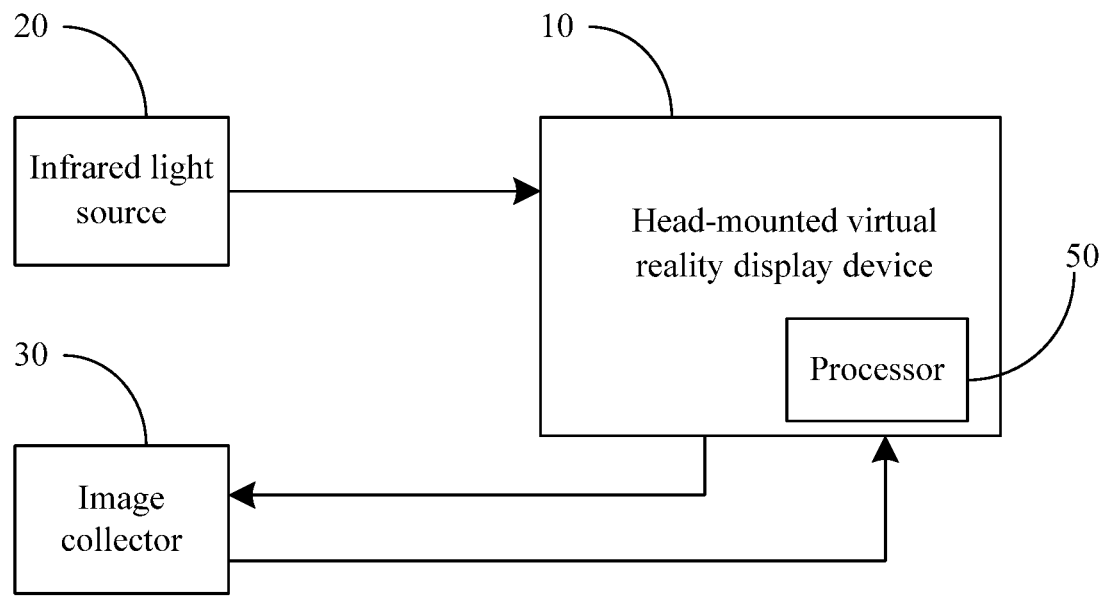
FIG. 6 is a block view schematically showing a virtual reality display apparatus in accordance with embodiments of the present disclosure.

In the example shown in FIG. 6, the present disclosure also provides a virtual realty display apparatus including the above head-mounted virtual reality display device 10, the infrared light source 20 and the image collector 30.

In the specific embodiments of the present disclosure, the above infrared light source and the image collector can be used in cooperation. The infrared light source 20 is mainly used to emit the infrared light beam to the infrared light reflector 200 on the body 100 of the head-mounted virtual reality display device. The infrared light source 20 may for example be an infrared light emitter (such as an infrared light LED emitter). The image collector 30 is mainly used to collect the infrared light beam reflected by the infrared light reflector 200 and to generate image data for calculating position and posture of the body 100 of the head-mounted virtual reality display device in space. The image collector 30 may be a camera or other devices for acquiring images. The infrared light source emits the infrared light beam to the infrared light reflector 200 of the head-mounted virtual reality display device 10 and the infrared light reflector 200 will reflect the infrared light beam. The image collector 30 may collect the infrared spots formed by the reflected infrared light beam and generate the image data. In the specific embodiments in which the infrared light reflector 200 is a retroreflecting film, the infrared light source 20 and the image collector 30 may be arranged adjacent to each other to save space of the apparatus.

In an optional example, the body 100 of the head-mounted virtual reality display device further includes a processor 50. The processor 50 may further be configured to receive the image data from the image collector 30 and to calculate the position and posture of the body 100 in space on a basis of the image data. The image collector 30 may transmit the image data to the processor 50 such that the processor 50 can finish the above calculation. For example, in case that the processor 50 is separated from the body 100 of the head-mounted virtual reality display device, the processor 50 will transmit information on the position and posture of the body in space to the body 100 of the head-mounted virtual reality display device 10 after the calculation is finished such that the body 100 of the head-mounted virtual reality display device can be positioned accurately.

The position and posture of the head-mounted virtual reality display device in space may be calculated by the known technology in the art, for example, recognition technology similar to Oculus Rift in the prior art. It only needs to replace acquiring the image of the light emitted from LCD by acquiring the image of the light reflected by the infrared light reflector, that is, to obtain an infrared image, and then the image collected by the image collector is transmitted into the above processor. Next, void information is filtered out by vision algorithms so as to obtain the position of the reflecting film. Then, by means of PnP (Perspective-n-point) algorithms, that is, by means of the position information of at least four infrared light reflectors that are not co-planar on the apparatus and the image information acquired from the at least four points, the head-mounted virtual reality display apparatus can finally be provided into the coordinate system of the camera to fit three-dimensional model of the apparatus and to monitor movements of hands and head of the user in real-time.

The information on position and posture of the head-mounted virtual reality display device in space may for example include rotation angle and translation information or the like. PnP is one of classic algorithms for calculating postures of the camera or objects in space in computer vision. The position and location of the camera or objects in space may be determined by scenes corresponding to n points. The specific contents of the algorithm are known in the art, and the details will be omitted herein.

Figure 7:
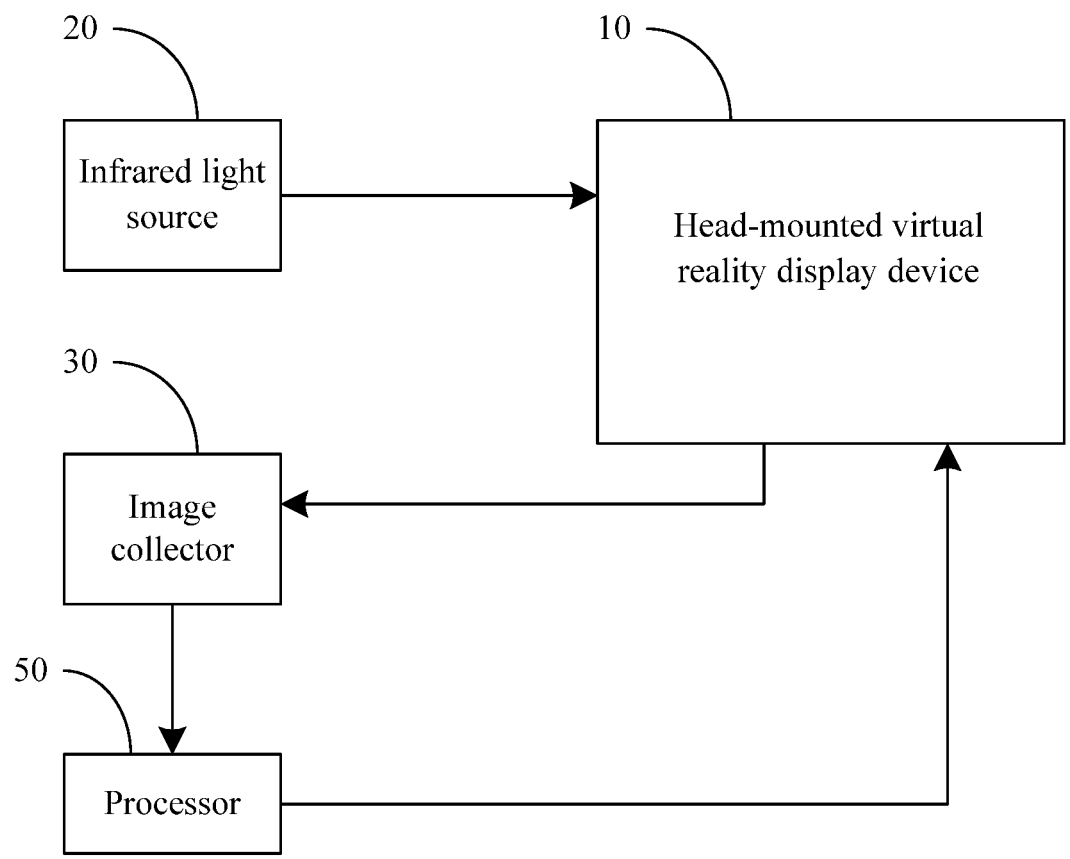
FIG. 7 is a block view schematically showing a virtual reality display apparatus in accordance with alternative embodiments of the present disclosure.

As an example, the processor 50 may be arranged in the body 100 of the head-mounted virtual reality display device (shown in FIG. 6), or may alternatively be arranged outside of the body 100 of the head-mounted virtual reality display device (or called as "separated from the body 100 of the head-mounted virtual reality display device", as shown in FIG. 7). In the case that the virtual reality display apparatus shown in FIG. 7 further includes the processor 50 separated from the body 100 of the virtual reality display apparatus, the processor 50 herein may be a computer or another terminal having computing function. The image collector 30 may transmit the image data to the processor 50 so that the processor 50 will calculate the position and posture of the body 100 of the head-mounted virtual reality display device.

In the specific embodiments of the present disclosure, the image collector 30 may be connected to the body 100 of the head-mounted virtual reality display device by wire or wireless communication. The wireless communication may include such as Bluetooth, WIFI. The wire communication may include such as USB communication.

Figure 8:
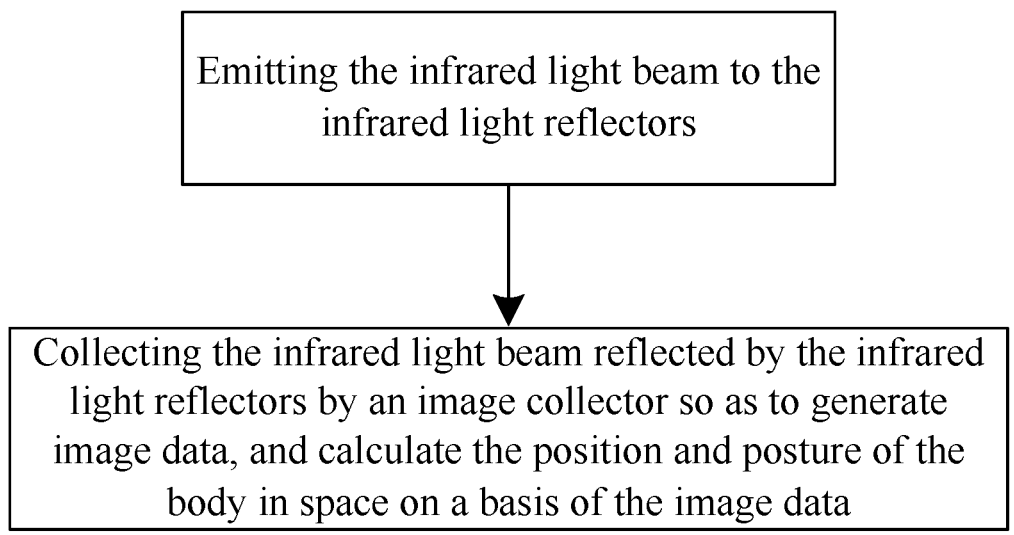
FIG. 8 is a flow chart of a method for measuring position and posture of the head-mounted virtual reality display device in accordance with embodiments of the present disclosure.

As shown in FIG. 8, the present disclosure also provides a method for measuring the position and posture of the head-mounted virtual reality display device. The method may include:

emitting the infrared light beam (for example using the infrared light source 20) to the infrared light reflectors 200; and collecting the infrared light beam reflected by the infrared light reflectors by the image collector 30 and generating image data, and calculating the position and posture of the body of the head-mounted virtual reality display device in space on a basis of the image data.

That is, in the course of the user taking actions using the head-mounted virtual reality display device 10, the infrared light source 20 may emit the infrared light beam to the infrared light reflectors 200 for reflecting the infrared light beam. The infrared light reflectors 200 may reflect the infrared light beam and the image collector 30 will collect the infrared spots formed by the reflected infrared light beam to generate the image data. The image data are processed and calculated to generate location information and then the location information is inputted into the body 100 of the head-mounted virtual reality display device. In this way, it may achieve real-time positioning of the body 100 of the head-mounted virtual reality display device, solve the current physical coordinates, position and posture of the body 100 of the head-mounted virtual reality display device, so as to enhance immersion of the user in use. And in the specific embodiments of the present disclosure, as the infrared light reflectors 200 can be mounted easily, the complicated profile of the head-mounted virtual reality display device 10 will not cause any difficulty in arrangement of the infrared light reflectors 200. Thus, the infrared light reflectors 200 and the head-mounted virtual reality display device 10 can be assembled conveniently and easily at low costs.

The above solutions of the present disclosure have advantages of low complexity of design. The reflectors are provided on an outer surface of the head-mounted virtual reality display device to reflect the infrared light beam such that the image collector collects image data containing the infrared spots, and the positioning of the head-mounted virtual reality display device in space can be achieved at high precision by processing and calculation on the image data. In the specific embodiments, the device may be assembled easily and have low costs. And the arrangement of the infrared light reflector will not be limited by profiles of the head-mounted virtual reality display device.

Apparently, the above embodiments of the present disclosure are intended to explain the present disclosure only by way of examples, instead of limiting embodiments of the present disclosure. On a basis of the above description, the skilled person in the art may also make modification or variation in other different forms. All of embodiments are not listed herein. Any apparent modifications or variations without departing from the solutions of the present disclosure will fall within the protection scope of the present disclosure.

What is claimed is:

1. A head-mounted virtual reality display device, comprising:
    a body; and
    at least four infrared light reflectors arranged on an outer face of the body and configured to retroreflect an infrared light beam,
    wherein the at least four infrared light reflectors are not co-planar,
    wherein the at least four infrared light reflectors comprise a first infrared light reflector and a second infrared light reflector, and wherein an infrared spot formed by the infrared light beam reflected by the first infrared light reflector is different from another infrared spot formed by the infrared light beam reflected by the second infrared light reflector and the first infrared light reflector has a larger reflection surface area than the second infrared light reflector.

2. The head-mounted virtual reality display device of claim 1, wherein each of the infrared light reflectors comprises a retroreflecting film.

3. The head-mounted virtual reality display device of claim 2, wherein the retroreflecting film comprises a reflective film with an array of beads.

4. The head-mounted virtual reality display device of claim wherein the reflection surface area of the first infrared light reflector is twice as much as the reflection surface area of the second infrared light reflector.

5. The head-mounted virtual reality display device of claim wherein the first infrared light reflector has a shape different from that of the second infrared light reflector.

6. A virtual reality display apparatus, comprising:
    the head-mounted virtual reality display device of claim 1;
    an infrared light source configured to emit the infrared light beam to the at least four infrared light reflectors; and
    an image collector configured to collect the infrared light beam reflected by the infrared light reflectors and to generate image data for calculating position and posture of the body in space.

7. The virtual reality display apparatus of claim 6, wherein the infrared light source and the image collector are arranged adjacent to each other.

8. The virtual reality display apparatus of claim 6, wherein the body comprises a processor configured to receive the image data from the image collector and to calculate the position and posture of the body in space on a basis of the image data.

9. The virtual reality display apparatus of claim 6, further comprising a processor separated from the body, the processor being configured to receive the image data from the image collector and to calculate the position and posture of the body in space on a basis of the image data; and
    wherein the processor is further configured to transmit information on the position and posture of the body in space to the body.

10. The virtual reality display apparatus of claim 6, wherein each of the infrared light reflectors comprises a retroreflecting film.

11. The virtual reality display apparatus of claim 10, wherein the retroreflecting film comprises a reflective film with an array of beads.

12. The virtual reality display apparatus of claim 6, wherein the at least four infrared light reflectors comprise a first infrared light reflector and a second infrared light reflector, and wherein an infrared spot formed by the infrared light beam reflected by the first infrared light reflector is different from another infrared spot formed by the infrared light beam reflected by the second infrared light reflector.

13. The virtual reality display apparatus of claim 12, wherein the first infrared light reflector has a larger reflection surface area than the second infrared light reflector.

14. A head-mounted virtual reality display device, comprising:
    a body; and
    at least four infrared light reflectors arranged on an outer face of the body and configured to retroreflect an infrared light beam,
    wherein the at least four infrared light reflectors are not co-planar,
    wherein the at least four infrared light reflectors comprise a first infrared light reflector and a second infrared light reflector, and wherein an infrared spot formed by the infrared light beam reflected by the first infrared light reflector is different from another infrared spot formed by the infrared light beach reflected by the second infrared light reflector, and wherein the body comprises a display screen and a head band which is connected with the display screen and wearable by a wearer, the display screen having a first side on which an image is to be displayed to the wearer and a second side facing away from the first side, the head band having a third side which faces away from the first side of the display screen when the head-mounted virtual reality display device is worn by the wearer, and wherein the first infrared light reflector comprises:

a third infrared light reflector arranged at a center of a surface on the second side of the display screen, and a fourth infrared light reflector arranged on a surface on the third side of the head band; and wherein the second infrared light reflector comprises:

a plurality of fifth infrared light reflectors arranged around the third infrared light reflector, and a plurality of sixth infrared light reflectors arranged around the fourth infrared light reflector on the surface on the third side of the head band.

15. The head-mounted virtual reality display device of claim 8, wherein the plurality of fifth infrared light reflectors arranged around the third infrared light reflector comprise:

a first group of the fifth infrared light reflectors arranged in a first peripheral region adjacent to an edge of the display screen and arranged to surround the third infrared light reflector, and a second group of the fifth infrared light reflectors arranged in a second peripheral region and arranged to surround the third infrared light reflector, the second peripheral region being closer to the third infrared light reflector than the first peripheral region;

wherein a plurality of said fourth infrared light reflectors are provided on the surface on the third side of the head band; and wherein each of the fourth infrared light reflectors is surrounded by at least some ones of the sixth infrared light reflectors.

16. The head-mounted virtual reality display device of claim 15, wherein one third infrared light reflector is arranged at the center of the surface on the second side of the display screen; and wherein the first group of the fifth infrared light reflectors comprises six fifth infrared light reflectors and the second group of the fifth infrared light reflectors comprises four fifth infrared light reflectors.

17. The head-mounted virtual reality display device of claim 15, wherein two fourth infrared light reflectors and six sixth infrared light reflectors are provided on the surface on the third side of the head band; and wherein each of the fourth infrared light reflectors is surrounded by four ones of the six sixth infrared light reflectors.

18. A method for measuring position and posture of the head-mounted virtual reality display device, the head-mounted virtual reality display device comprising: a body; and at least four infrared light reflectors arranged on an outer face of the body and configured to retroreflect an infrared light beam, wherein the at least four infrared light reflectors are not co-planar, the method comprising:

emitting the infrared light beam to the infrared light reflectors; and collecting the infrared light beam reflected by the infrared light reflectors by an image collector so as to generate image data, and calculate the position and posture of the body in space on a basis of the image data, wherein the at least four infrared light reflectors comprise a first infrared light reflector and a second infrared light reflector, and wherein an infrared spot formed by the infrared light beam reflected by the first infrared light reflector is different from another infrared spot formed by the infrared light beam reflected by the second infrared light reflector and the first infrared light reflector has a larger reflection surface area than the second infrared light reflector.

* * * * *